United States Patent

Weaving et al.

[15] 3,702,111
[45] Nov. 7, 1972

[54] ATMOSPHERIC POLLUTION CONTROL ARRANGEMENT FOR INTERNAL COMBUSTION ENGINE

[72] Inventors: John Harold Weaving; Cecil David Haynes, both of c/o British Leyland Motor Corp. Limited, Group Research Laboratory, (Atmospheric Pollution Control) Juguar Works, Browns Lane, Coventry, England

[22] Filed: Feb. 19, 1971

[21] Appl. No.: 116,829

[30] Foreign Application Priority Data

Feb. 19, 1970    Great Britain............7,908/70

[52] U.S. Cl.............123/119 A, 123/75 B, 123/75 C
[51] Int. Cl. ....................F02m 25/06, F02b 47/08
[58] Field of Search...........123/119 A, 75 B, 75 C

[56] References Cited

UNITED STATES PATENTS

| | | | |
|---|---|---|---|
| 1,332,803 | 3/1920 | Chorlton | 123/75 C |
| 1,384,133 | 7/1921 | Howe | 123/119 A |
| 1,597,917 | 8/1926 | Maedler | 123/119 A |
| 1,833,802 | 11/1931 | Violet | 123/75 C |
| 1,952,881 | 3/1934 | Minter | 123/75 B |
| 3,583,375 | 6/1971 | Pischinger | 123/119 A |

FOREIGN PATENTS OR APPLICATIONS 344,072   11/1921   Germany...............123/119 A

*Primary Examiner*—Wendell E. Burns
*Attorney*—Mawhinney & Mawhinney

[57] ABSTRACT

A multi-cylinder internal combustion engine having a valve in addition to normal inlet and exhaust valves in the cylinders of the engine through which part of the gaseous products of combustion are removable, before they have passed through the exhaust system of the engine and are re-introduced into another cylinder of the engine after closure of the inlet valve thereof. The additional valves of the cylinders are interconnected in pairs by manifolds to permit this recirculation of exhaust gases. By recirculating part of the exhaust gases from each cylinder in this way the proportion of oxides of nitrogen in the final exhaust gases from the engine is reduced.

4 Claims, 3 Drawing Figures

PATENTED NOV 7 1972 3,702,111

INVENTORS
JOHN HAROLD WEAVING, &
CECIL DAVID HAYNES

ATMOSPHERIC POLLUTION CONTROL ARRANGEMENT FOR INTERNAL COMBUSTION ENGINE

The invention relates to the control of exhaust gas emissions from internal combustion engines and in particular to the emission of oxides of nitrogen.

Due to the high temperature of combustion in the combustion chambers of internal combustion engines, both of the spark ignition and compression ignition types, oxides of nitrogen (principally nitric oxide) are formed by the combustion of nitrogen and oxygen from the air. Oxides of nitrogen are poisonous and the reduction of them in exhaust gases from internal combustion engines is the subject of the legislation or porposed legislation in several countries.

It is well-known that the proportion of oxides of nitrogen may be considerably reduced by the recirculation of a proportion of the exhaust gases into the engine via the inlet manifold, through which air or air and fuel are normally induced, in the cases of compression ignition and spark ignition engines respectively. This method of introducing exhaust gas causes a reduction in power and usually a deterioration in fuel consumption. It may also contaminate the carburettor in a spark ignition engine. An object of this invention to reduce the proportions of oxides of nitrogen in exhaust gas coupled with the mitigation or elimination of these deleterious effects.

According to the invention, an internal combustion engine comprising at least two cylinders, each having inlet and exhaust valve means, also includes additional valve means in each cylinder through which part of the gaseous products of combustion are removable before they have passed through the exhaust system of the engine, the engine also including duct means interconnecting the cylinders in pairs for re-introducing the gaseous products of combustion extracted through the additional valve means of one cylinder of an interconnected pair into the other cylinder of the interconnected pair after closure of the inlet valve means and before the next opening of the exhaust valve means of said other cylinder and actuating means for opening and closing the additional valve means of the respective cylinders in timed relationship to the opening and closing of the inlet and exhaust valve means of the cylinders of interconnected pairs.

Conveniently the additional valve means may comprise a poppet valve arranged to be opened and closed by a cam-shaft. Where the inlet and exhaust valves of the cylinder or cylinders are also poppet valves operable by a cam-shaft or cam-shafts, a cam-shaft for controlling the opening and closing of inlet and/or exhaust valves may also be employed as or be interconnected with the cam-shaft for the additional poppet valve or valves.

By re-introducing part of the gaseous products of combustion into a cylinder of the engine after the inlet valve of the relevant cylinder has closed, the full inlet charge of air or air and fuel is maintained, whereas in known arrangements for re-introducing exhaust gases into the cylinder, at least part of the inlet charge has been displaced by the recirculated gases, thereby affecting engine performance.

An example of a multi-cylinder internal combustion engine in accordance with this invention is now described with reference to the accompanying drawings, in which.

Figure 1:
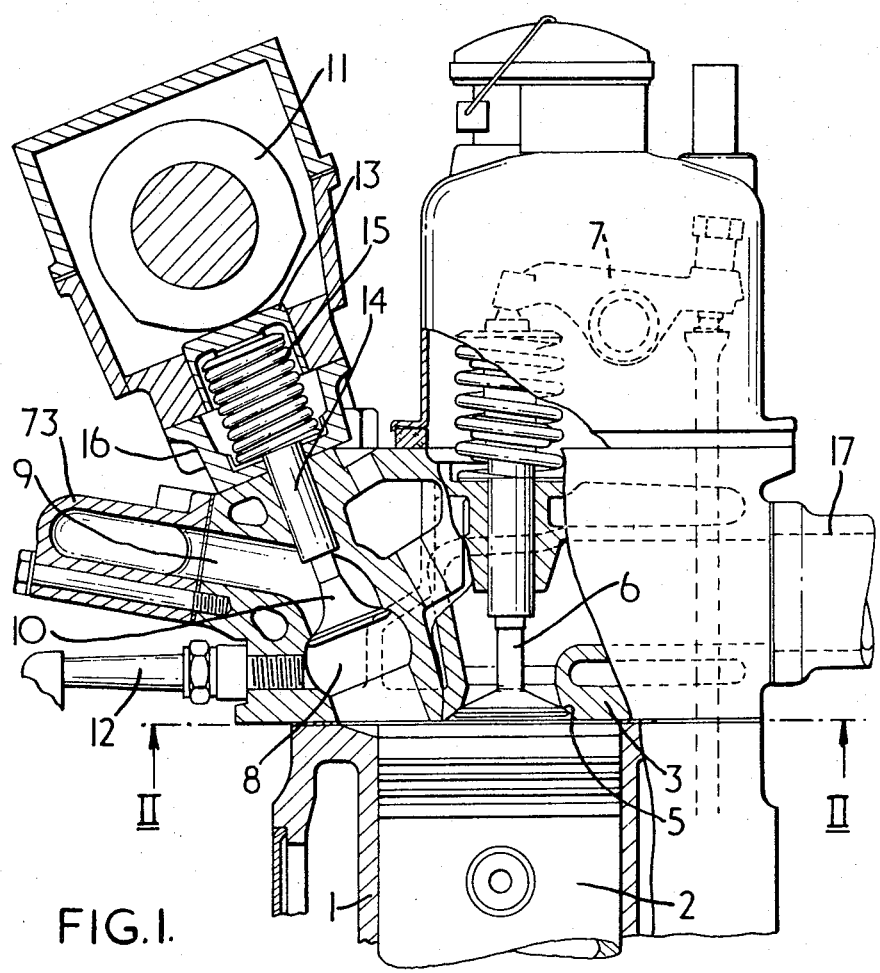
FIG. 1 is a part end elevation of the cylinder block of the engine and part-axial section through the head portion of a cylinder thereof.
Figure 2:
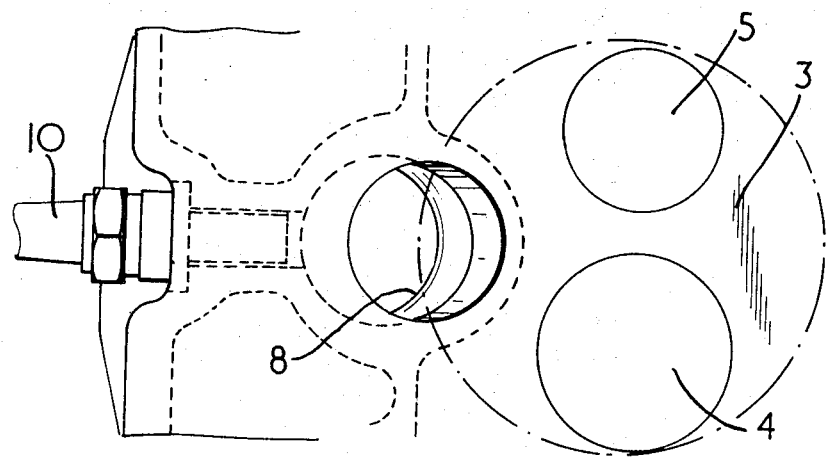
FIG. 2 is a diagrammatic view of the cylinder head on the line II—II in FIG. 1.

Referring firstly to FIGS. 1 and 2 each cylinder 1 contains a piston 2 and has a head 3 defining seats 4, 5 for inlet and exhaust poppet valves of which one (the exhaust valve) is shown at 6 in FIG. 1. The valves are opened and closed in known manner by an engine-driven cam-shaft (not shown) through rocker arms of which one is shown at 7. The head 3 of each cylinder defines a combustion space 8 provided with a spark plug 12 and leading to a closed receiver chamber 9 via a third poppet valve 10 arranged to be opened and closed to admit gases into and out of the receiver chamber 9. The third poppet valve 10 is the aforesaid additional valve means. The third poppet valve is opened by a further cam-shaft 11 engaging a cap 13 carried by the end of the shaft 14 of the valve 10 and is closed by means of a spring 15 acting between the cap 13 and a fixed valve housing 16. The cam-shaft 11 is driven in timed relationship to the main cam-shaft for opening and closing the inlet and exhaust valves.

Figure 3:
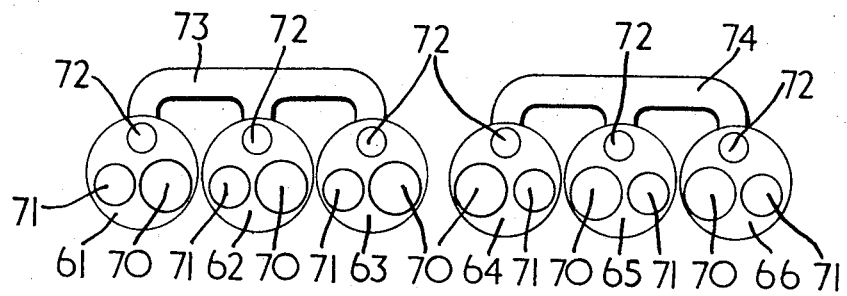
FIG. 3 is a diagrammatic drawing showing end views of the cylinders of the engine, each cylinder being generally similar to that shown in FIGS. 1 and 2.

The engine to be described by way of example of this invention is a six-cylinder, four cycle engine each cylinder having inlet and exhaust poppet valves arranged to be interconnected in pairs are indicated in FIG. 3 which shows diagrammatically end views of the six cylinders.

Each cylinder 61, 62, 63, 64, 65 and 66 has an inlet valve 70, an exhaust valve 71 and the additional or third poppet valve 72 and is generally similar to the cylinder illustrated in FIGS. 1 and 2. The seats of the additional or third poppet valves 72 of cylinders Nos. 61, 62 and 63 are interconnected by a first manifold 73 (also shown in FIG. 1) and the seats of the additional or third poppet valves 72 of cylinders Nos. 64, 65 and 66 are interconnected by a second manifold 74 similar to manifold 73. The valves 72 are arranged to be opened and closed by a cam-shaft similar to that shown at 11 in FIG. 1 and their opening and closing is so timed that the cylinders will be interconnected in pairs through either the manifold 73 or the manifold 74. In a six-cylinder engine having a conventional firing order 1, 5, 3, 6, 2, 4, the cylinders are interconnected in pairs in the following sequence: 61 and 63, 65 and 66, 63 and 62, 66 and 64, and 62 and 61. Other timing arrangements can be provided for engines having different firing orders or different numbers of cylinders.

The opening and closing of the poppet valves 72 are also so timed in relation to the timing of the opening and closing of the inlet and exhaust valves 70 and 71 of the relevant cylinders that the additional or third valve 72 of one cylinder of an interconnected pair will be opened during part of the time the exhaust valve of that cylinder is open, whereby part of the gaseous products of combustion will be removed from the said one cylinder to be re-introduced through the manifold 73 or 74 into the other cylinder of the interconnected pair instead of passing through the exhaust valve of the said one cylinder to the exhaust system of the engine. The third valve 72 may be opened before the exhaust valve 71 of the said one cylinder, as it may be advantageous to have pressure in the manifold 73 or 74 at the time the valve 71 is opened. The additional or third valve 72 of the other cylinder of the pair is timed to be opened to the said other cylinder at the time the inlet valve 70 thereof closes or shortly after it has closed. In this way the exhaust gases diverted from one cylinder through the manifold 73 or 74 are introduced into the other cylinder of an interconnected pair without affecting the inlet charge to said other cylinder.

What we claim as our invention and desire to secure by Letters Patent of the United States is:

1. An internal combustion engine comprising at least two cylinders having inlet and exhaust valve means also including additional valve means through which part of the gaseous products of combustion are removable, before they have passed through the exhaust system of the engine, said additional valve means being openable during the power stroke of the engine before said exhaust valve means opens whereby gaseous products of combustion extracted through the additional valve means will have a pressure substantially greater than atmospheric pressure, and means for re-introducing the gaseous products of combustion extracted through the additional valve means into one of said cylinders at a pressure substantially greater than atmospheric pressure after closure of the inlet valve means thereof whereby a lower combustion temperature will be obtained thereby reducing the quantity of oxides of nitrogen in the gaseous products of combustion.

2. An engine as claimed in claim 1 in which each cylinder includes said additional valve means through which part of the gaseous products of combustion are removable before they have passed through the exhaust system of the engine, the engine also including duct means interconnecting the cylinders in pairs for re-introducing the gaseous products of combustion extracted through the additional valve means of one cylinder of an interconnected pair into the other cylinder of the interconnected pair after closure of the inlet valve means and before the next opening of the exhaust valve means of said other cylinder and actuating means for opening and closing the additional valve means of the respective cylinders in timed relationship to the opening and closing of the inlet and exhaust valve means of the cylinders of interconnected pairs.

3. An engine as claimed in claim 2 in which said additional valve means in each cylinder comprises a poppet valve and a cam-shaft for opening and closing said poppet valves.

4. An engine as claimed in claim 3 having a cam-shaft for controlling the opening and closing of inlet and exhaust valves of the engine in which the latter cam-shaft is also employed to open and close the poppet valve comprising said additional valve means.

* * * * *